June 9, 1936. T. A. ROWE 2,043,519
AIR AND WATERPROOF JOINT FOR SILO STAVES AND THE LIKE
Filed Nov. 14, 1933
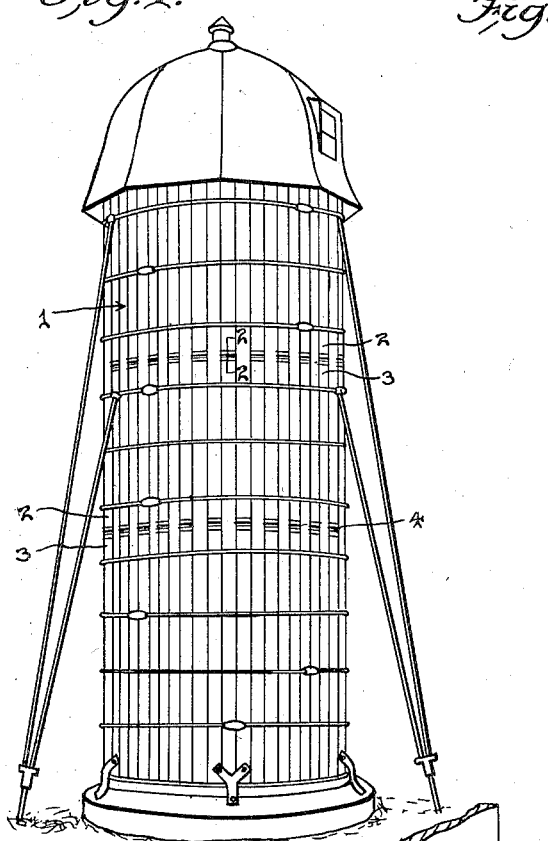
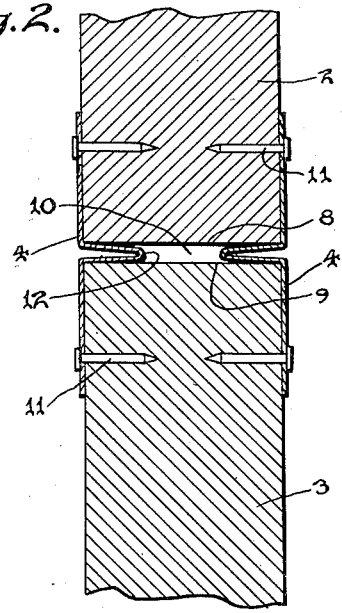
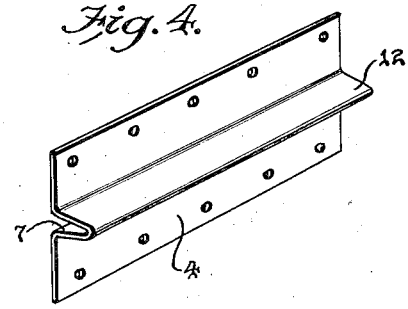
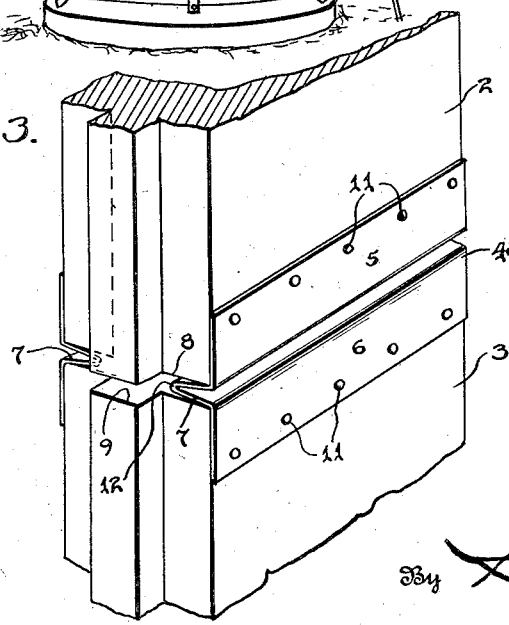
Inventor
Thomas A. Rowe,
By
Attorney Patented June 9, 1936

2,043,519

UNITED STATES PATENT OFFICE 2,043,519

AIR AND WATERPROOF JOINT FOR SILO STAVES AND THE LIKE

Thomas A. Rowe, Le Roy, N. Y.

Application November 14, 1933, Serial No. 698,011

1 Claim. (Cl. 20—1.4)

The invention relates to a water and air proof joint for the staves of silos and similar structures.

The object of the present invention is to provide for the staves of silos and similar structures a simple, practical and efficient water-proof and air-proof joint of strong, durable and comparatively inexpensive construction, adapted to exclude from the joint air and moisture both from the inside of a silo or similar structure and also from the exterior of the same, whereby decaying, rotting and other detertioration of the lumber at the joints of the staves resulting from exposure to air and moisture and the drying of the staves by the sun are effectually prevented.

A further object of the invention is to provide a joint of this character which will obviate the necessity of milling or machining lumber in any special way whatsoever, and which, should the ends of the staves not be even or square, provide a structure which will more than cover the open space between the adjacent ends of the staves and at the same time add strength to the weakest place of the staves.

It is also an object of the invention to provide a stave joint which will permit the convenience of handling shorter lengths of staves and yet afford the advantage of a one-piece stave the full length of the desired height of a silo.

Another object of the invention is to provide a stave joint adapted without affecting the airtight and water-tight character of the joint to yield to and permit the contraction and expansion which takes place due to freezing, absorption of moisture and drying out of the staves when the silo is empty.

Another object of the invention is to provide a stave joint which will when desired, permit and retain the use of a sealing material such as roofing cement, asphaltum or tar, to protect the ends of the stave.

Another object of the invention is to provide a stave joint which will obviate the necessity of employing skilled labor in the construction of a silo and the sawing machine involved in and the wasting of material resulting from special joints dependent upon the accuracy of the feeding or sawing to render it efficient and practical.

With these and other objects in view the invention consists in the construction and novel combination and arrangement of parts hereinafter fully described, illustrated in the accompanying drawing and pointed out in the claim hereto appended, it being understood that various changes in the form, proportion and minor details of construction, within the scope of the claim, may be resorted to without departing from the spirit or sacrificing any of the advantages of the invention.

In the drawing:—

Figure 1 is a perspective view of a silo provided with air and water proof stave joints constructed in accordance with this invention.

Fig. 2 is an enlarged detail vertical sectional view on the line 2—2 of Fig. 1.

Fig. 3 is an enlarged detail perspective view of the adjacent ends of the upper and lower sections of a stave provided with the improved water and air tight joint of the present invention.

Fig. 4 is a detail perspective view of one of the stave joint splines.

In the accompanying drawing in which is illustrated the preferred embodiment of the invention, I designates the silo having a body portion composed of upper and lower stave sections 2 and 3 connected by the air and water proof joint of the present invention to form a full length stave the entire height of the body portion of the silo.

As illustrated in Fig. 1 of the drawing the adjacent staves have their joints staggered and while the upper joints of the silo are arranged in the same horizontal plane and the lower joints are also arranged in the same horizontal plane, it will be understood that the joints which are staggered may occur at various points between the top and bottom of the silo.

Each joint comprises in its construction one or two joining splines 4 stamped or otherwise formed of galvanized iron, zinc, copper, roofing paper or any other suitable material, and composed of upper and lower plate members 5 and 6 and an approximately horizontal folded connecting member 7 interposed between the lower end 8 of the upper stave section 2 and the upper end 9 of the lower stave section 3, there being an intervening space 10 between the lower end of the upper stave section 2 and the upper end of the lower stave section 3 adapted to receive sealing material, such as roofing cement, tar, asphaltum cement or any other suitable material when it is desired to apply the same to the joined ends of the stave sections for protecting the staves at the joints. Such material may be dispensed with as the joint splines provide a joint which is both water-tight and air-tight and when applied to the ends of the stave sections 2 and 3 at both faces of the staves, as illustrated in Figs. 2 and 3 of the drawing, air and moisture will be excluded from the joint both from the interior of the silo and from the exterior of the same. The plate members 5 and 6 fit flat against the contiguous faces of the stave sections 2 and 3 and are secured to the same by suitable fastening devices 11.

The adjacent ends of the staves fit in angles formed by the plate members 5 and 6 and the folded connecting member 7 which is resilient and adapted to yield to the contraction and expansion of the staves at the joint resulting from freezing, absorption of moisture and the drying out of the staves. The folded connecting member 7 is approximately V-shaped and is composed of slightly converging sides and a curved connecting bend 12 which is adapted to permit relative movement between the sides without liability of the joining spline breaking at the bend 12. The staves are composed of the usual tongue and groove lumber employed in structures of this character and in erecting a silo or similar structure it is not necessary to employ skilled labor or to square the ends of the lumber as the joining spline is ample to cover any space which may occur by reason of such irregular ends. Also by enabling material of this character to be employed there is no waste of material incident to squaring or otherwise preparing the ends of the stave sections for special joints and the full length stave of the complete height of the body portion of the silo may be formed by the stave sections and the joint spline. The staves may be joined together on the ground before being assembled in a silo, water tank or the like or the joints may be made while the silo is being constructed. The joint spline increases the strength of the staves at the weakest place, namely, the joint betwen the stave sections and permits expansion and contraction without affecting the water and air-tight character of the joints.

If desired, a single joint spline may be employed at each joint and when a single joint spline is used it may be arranged at either the outer or inner faces of the stave sections either exteriorly or interiorly of the structure.

What is claimed is:—

A joint for connecting the adjacent ends of upper and lower stave sections of a silo and like structure consisting of a pair of inner and outer joint covering members of sheet material applied to the inner and outer faces of the staves in opposing relation, each member consisting of upper and lower flat, vertically aligned and flangeless plate members secured in uniform contact with the flat side faces of the upper and lower stave sections to prevent the passage of water or moisture between the staves and the plate members, and a resilient folded connecting member composed of straight flat upper and lower portions formed integral with one another and with the upper and lower plate members and converging sharply toward one another, the said resilient folded connecting portions of the two opposed joint covering members extending between the spaced ends of the upper and lower stave sections, in opposing spaced-apart relation to close opposite sides of the space between the staves and adapt said space to the reception of a joint sealing material, and each of said resilient connecting members having a narrow integral curved and resilient connecting portion adapted to permit the upper and lower portions of the member to be compressed and to assume different angles corresponding with variations in the space between the stave ends, whereby a closed water and air-tight joint is thus completed for fully protecting the spaced-apart stave ends from the destructive influence of air and moisture at both the inner and outer sides of the structure and a complete closure is effected to permanently maintain joint sealing material in the said space between the stave ends.

THOMAS A. ROWE.